(12) United States Patent
Xiao (10) Patent No.: US 10,511,759 B2
(45) Date of Patent: Dec. 17, 2019

(54) IMAGE CAPTURING TERMINAL AND IMAGE CAPTURING METHOD

(71) Applicant: Yulong Computer Telecommunication Scientific (Shenzhen) Co., Ltd., Shenzhen, Guangdong (CN)

(72) Inventor: Lifeng Xiao, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/314,439

(22) PCT Filed: Jan. 30, 2015

(86) PCT No.: PCT/CN2015/072003
§ 371 (c)(1),
(2) Date: Nov. 28, 2016

(87) PCT Pub. No.: WO2015/180509
PCT Pub. Date: Dec. 3, 2015

(65) Prior Publication Data
US 2017/0201673 A1    Jul. 13, 2017

(30) Foreign Application Priority Data

May 29, 2014    (CN) .......................... 2014 1 0236100

(51) Int. Cl.
*H04N 5/232* (2006.01)
*G03B 13/36* (2006.01)
(Continued)

(52) U.S. Cl.
CPC ......... *H04N 5/23212* (2013.01); *G02B 7/285* (2013.01); *G02B 7/36* (2013.01);
(Continued)

(58) Field of Classification Search
CPC .......... G02B 7/285; G02B 7/365; G02B 7/38; H04N 5/23212; H04N 5/247; G03B 13/36
See application file for complete search history.

(56) References Cited

U.S. PATENT DOCUMENTS

2003/0160886 A1    8/2003   Misawa et al.
2007/0122137 A1    5/2007   Ohnishi
(Continued)

FOREIGN PATENT DOCUMENTS

CN     101075073 A     11/2007
CN     101222585 A     7/2008
(Continued)

OTHER PUBLICATIONS

Extended European search report issued in corresponding European application No. 15798733.0 dated Dec. 14, 2017.

*Primary Examiner* — Timothy J Henn
(74) *Attorney, Agent, or Firm* — Young Basile Hanlon & MacFarlane, P.C.

(57) ABSTRACT

An image capturing terminal includes a first camera module, a second camera module, and a processing module. The first camera module and the second camera module are used for framing concurrently a same scene and for detection and analysis according to contrast ratios of different frames of images, in which a focus search range includes a first focus area and a second focus area that do not overlap each other. The processing module is used for controlling the first camera module to search for a focus in the first focus area and, at the same time, for controlling the second camera module to search for a focus in the second focus area, and for capturing focus information of either the first camera module or the second camera module, and is used for controlling, according to the focus information, the first camera module to capture an image at the focus point.

20 Claims, 2 Drawing Sheets

(51) Int. Cl.
  *H04N 5/247* (2006.01)
  *G02B 7/36* (2006.01)
  *G02B 7/28* (2006.01)
  *H04N 5/225* (2006.01)

(52) U.S. Cl.
  CPC ........... *G03B 13/36* (2013.01); *H04N 5/2258* (2013.01); *H04N 5/247* (2013.01)

(56) References Cited

U.S. PATENT DOCUMENTS

| | | | |
|---|---|---|---|
| 2008/0211941 A1* | 9/2008 | Deever | H04N 5/2258 |
| | | | 348/262 |
| 2008/0219654 A1* | 9/2008 | Border | H04N 5/23212 |
| | | | 396/89 |
| 2011/0150446 A1 | 6/2011 | Song | |
| 2011/0234768 A1* | 9/2011 | Pan | G02B 7/38 |
| | | | 348/47 |
| 2012/0013757 A1 | 1/2012 | Beckers et al. | |
| 2013/0002830 A1* | 1/2013 | Pan | G02B 7/36 |
| | | | 348/49 |
| 2013/0053101 A1 | 2/2013 | Tsai et al. | |
| 2013/0070061 A1* | 3/2013 | Pan | G03B 13/36 |
| | | | 348/49 |
| 2014/0247344 A1* | 9/2014 | Fujiwara | G01C 3/06 |
| | | | 348/139 |
| 2016/0246160 A1* | 8/2016 | Huang | G03B 13/36 |
| 2016/0261787 A1* | 9/2016 | Urfalioglu | H04N 5/2258 |
| 2016/0266467 A1* | 9/2016 | Lou | G02B 7/285 |

FOREIGN PATENT DOCUMENTS

| | | |
|---|---|---|
| CN | 102854704 A | 1/2013 |
| CN | 103986877 A | 8/2014 |
| JP | 2012177851 A * | 9/2012 |
| JP | 2012177851 A * | 9/2012 |

* cited by examiner

IMAGE CAPTURING TERMINAL AND IMAGE CAPTURING METHOD

CROSS-REFERENCE TO RELATED APPLICATION(S)

This present application claims the benefit of priority to China Patent Application No. 201410236100.4, filed in Chinese Patent Office on May 29, 2014, and entitled "IMAGE CAPTURING TERMINAL AND IMAGE CAPTURING METHOD", the content of which is hereby incorporated by reference in its entirety.

TECHNICAL FIELD

The present invention relates to the field of terminal shooting, and more particularly, to an image capturing terminal and an image capturing method, which can achieve quick autofocus.

BACKGROUND

Autofocus can be realized by using the principle of light reflection on an object, and accepting reflected light from the object by a sensor CCD (charge-coupled device) of a camera, and driving an electric focusing device to automatically focus under the control of a computer. A focusing method by using contrast ratio can realize autofocus by detecting the contour edge of an image. The clearer the contour edge of the image is, the greater the brightness gradient is, or the greater the contrast ratio between the object of edge and the background of the image is. On the contrary, the contour edge of an out-of-focus image blurs, and the brightness gradient or the contrast ratio descends. The farther the out-of-focus is, the lower the contrast ratio is.

An existing single-camera focusing system can realize autofocus on the basis of a VCM (voice coil motor) gradually moving from an initial focus to a far focus, comparing the data of focusing window areas between different frames, finding the clearest point, and then completing the focusing process. However, under the condition of continuous improvement of the resolution of a terminal camera such as a mobile phone camera, the terminal camera generally outputs an image in the form of full resolution while previewing the image, realizing zero delay function, therefore, the frame rate is lower. For example, the resolution of an existing camera is about 20 MP, but the frame rate of the camera is only 12 fps when the camera outputs an image in form of full resolution. Moreover, under low illumination environment, general processing on the image is to reduce the frame rate to obtain higher image brightness and lower noise. Therefore, the existing frame detection contrast ratio method has the disadvantage of poor performance, longer focus time and slower focus speed under the condition of previewing images in the form of full resolution by the single-camera and lower light environment, thus resulting in affecting the user experience.

Therefore, how to provide an image capturing terminal and an image capturing method for achieving quick autofocus, is a technical problem to be solved for the persons having ordinary skill in the art.

SUMMARY

To solve the above problems, the present disclosure aims to provide an image capturing terminal and an image capturing method, so as to solve the problem of lower focus speed in the prior art.

In order to achieve the above purpose, the present disclosure provides an image capturing terminal and an image capturing method.

An image capturing terminal includes a first camera module, a second camera module and a processing module; the first camera module and the second camera module are configured to frame concurrently the same scene and detect and analyze on the basis of the contrast ratios of different frames of images, where a focus search range includes a first focus area and a second focus area that do not overlap each other; the processing module is configured to control the first camera module to search for a focus in the first focus area, at the same time, to control the second camera module to search for a focus in the second focus area; and the processing module is further configured to capture focus information of either the first camera module or the second camera module, and to control the first camera module to capture an image at the focus on the basis of the focus information.

In the technical solution, a focus position at a hyperfocal distance is defined as a first focus point, and a focus position where a camera module can be focused at the closest distance is defined as a second focus point, and a focus position at half of the hyperfocal distance is defined as a focus end point; a focus range between the first focus point and the focus end point is defined as the first focus area, and a focus range between the second focus point and the focus end point is defined as the second focus area.

In the technical solution, a focus position at a hyperfocal distance is defined as a first focus point, and a focus position where a camera module can be focused at the closest distance is defined as a second focus point, and a focus position at half of the hyperfocal distance is defined as a focus end point; a focus range between the second focus point and the focus end point is defined as the first focus area, and a focus range between the first focus point and the focus end point is defined as the second focus area.

In the technical solution, when the processing module receives the focus information of the first camera module, the processing module is configured to control the first camera module to be located at the focus, and capture the image at the focus and output the image.

In the technical solution, when receiving the focus information of the second camera module, the processing module is configured to control the first camera module to move directly a focus position to the focus on the basis of the focus information of the second camera module.

In the technical solution, the first camera module includes a first lens, a first actuator and a first image sensor, and the second camera module includes a second lens, a second actuator and a second image sensor; the first actuator is configured to drive the first lens to move to the first image sensor to search for the focus, and the second actuator is configured to drive the second lens to move relative to the second image sensor to search for the focus under the control of the processing module, and the processing module is configured to control the first actuator to directly drive the first lens to move to a focus position according to position information corresponding to the focus of the second camera module.

In the technical solution, when the first camera module and the second camera module find the focus at the same time, the processing module is further configured to determine to employ the focus searched by the first camera module as the focus of the first camera module.

An image capturing terminal includes a first camera module, a second camera module and a processing module;

the first camera module and the second camera module are configured to frame concurrently the same scene, and detect and analyze on the basis of the contrast ratios of different frames of images, where a focus search range includes: a first focus area and a second focus area that do not overlap each other; the processing module is configured to control the first camera module to search for a focus in the first focus area, at the same time, to control the second camera module to search for a focus in the second focus area; and the processing module is further configured to control one of the first camera module and the second camera module which first captures focus information thereof to capture an image at the focus.

An image capturing method applied to an image capturing terminal includes a first camera module and a second camera module; the image capturing method includes:

controlling the first camera module and the second camera module to frame concurrently the same scene;

controlling the first camera module and the second camera module to search for a focus respectively in respective focus areas which do not overlap each other and capturing position information of the focus of either the first camera module or the second camera module;

determining the focus of the first camera module on the basis of obtained focus information; and controlling the first camera module to capture an image at the focus.

In the technical solution, controlling the first camera module to be located at the focus, and capture the image at the focus and output the image when capturing the focus information of the first camera module; controlling a focus position of the first camera module to directly move to the focus according to the focus information when capturing the focus information of the second camera module.

The image capturing method and terminal provided in the present disclosure employ a first camera module and a second camera module, and the first camera module and the second module are used for framing concurrently the same scene, and the first camera module can output the images with higher resolution. The focus search range is divided into two parts (such as a first focus area and a second focus area) that do not overlap each other, the first camera module and the second camera module are concurrently controlled to search for a focus in their respective parts at the same time, when focus information of the focus is found, the first camera module is controlled to capture clear images at the focus on the basis of the focus information of the focus, compared with only the first camera module outputting the image with high resolution for autofocus, which can improve the speed of focus. Thus, the image capturing method in this embodiment can guarantee the output of high resolution images, and have a shorter autofocus time at the same time, thereby improving the speed of autofocus and enhancing the user experience.

DETAILED DESCRIPTION

In order to illustrate the embodiments or existing technical solutions more clearly, a brief description of drawings that assists the description of embodiments of present disclosure or existing art will be provided below. It should be noted that, in the case of no conflict, the embodiments of the present disclosure and the features of each embodiment can be combined mutually. The invention will now be described in detail on the basis of preferred embodiments and drawings. It is to be understood that various changes may be made without departing from the spirit and scope of the disclosure and the embodiments of the present disclosure and features in the embodiments can be combined with each other.

Figure 1:
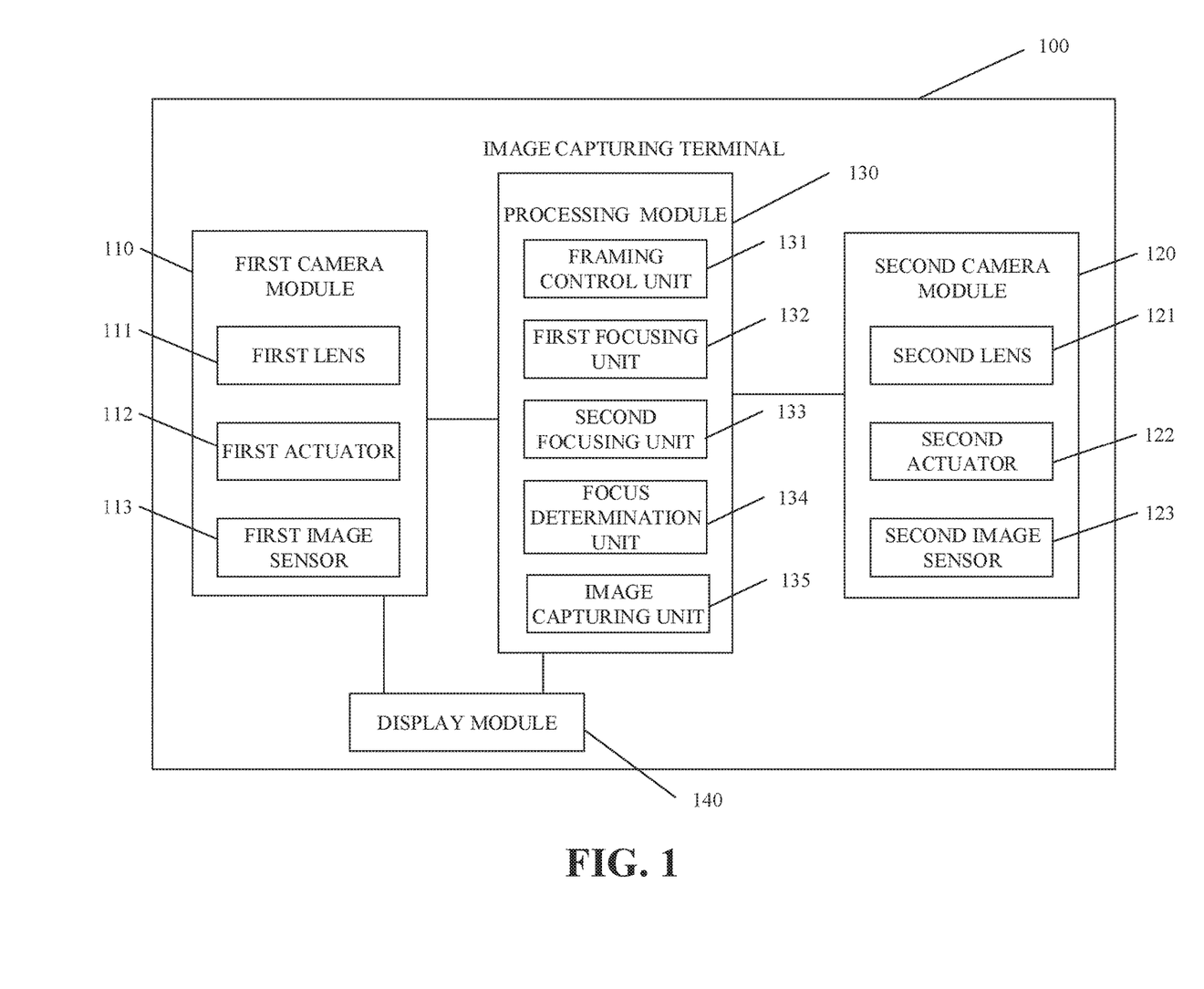
FIG. 1 is a block diagram of an image capturing terminal according to an embodiment of the present disclosure.

Referring to FIG. 1, FIG. 1 is a block diagram of an image capturing terminal 100 according to an embodiment of the present disclosure. The image capturing terminal 100 in this embodiment can be a mobile phone, a table computer, and other intelligent devices. The shooting referred in the present disclosure includes, but not limited to, taking pictures, recording video, and so on. The taking pictures is taken here as an example to describe the present disclosure. It should be understood that video can synthesized by multiple pictures according to the time order, namely, the present disclosure also applies to video shooting.

In this embodiment, the image capturing terminal 100 includes a first camera module 110, a second camera module 120, a processing module 130 and a display module 140.

In detail, the first camera module 110 and the second camera module 120 are configured to sample (e.g., taking pictures, recording video) an external scene. That is, the first camera module 110 and the second camera module 120 are used for framing the external scene. The first camera module 110 and the second camera module 120 may include the same camera lens, namely, the first camera module 110 and the second camera module 120 have the same optical coefficient, such as using the camera lenses with the same optical coefficient. In this embodiment, the first camera module 110 includes a first image sensor 113, and the second camera module 120 includes a second image sensor 123. The optical axis of the first camera module 110 is parallel to the optical axis of the second camera module 120, and the first image sensor 113 and the second image sensor 123 are located in the same plane perpendicular to the first camera module 110. In this embodiment, the first camera module 110 is the same as the second camera module 120. The first camera module 110 is configured to obtain high resolution images, which is greater than the resolution of the images outputted by the second camera module 120. The second camera module 120 is used for auxiliary focus, that is, the second camera module 120 can assist the image capturing terminal 100 to focus. It should be understood that the second camera module 120 can also be used for capturing images.

In detail, in this embodiment, the first camera module 110 includes a first lens 111, a first actuator 112 and the first image sensor 113. The first lens 111 can includes one or more than one optical lenses, which is configured to obtain optical images of a framed scene. The first image sensor 113 is configured to sense the optical images obtained by the first lens 111. The first camera module 110 is configured to shoot and frame the scene, and output the optical images sensed by the first image sensor 113 with a higher resolution. For example, the first camera module 110 can output the images with the maximum resolution, such as 20 MP. That is, the first camera module 100 can output the images with the maximum resolution that the first camera module 100 itself can output. The first actuator 112 is configured to drive the first lens 111 to move relative to the first image sensor 113 under the control the processing module 130 so as to make the first camera module 110 to automatically focus. In this embodiment, the first actuator 112 can be a closed-loop motor. The first actuator 112 as a closed-loop motor can drive the first lens 111 to move, and sense position information corresponding to movements of the first lens 111, and send the position information to the processing module 130.

In this embodiment, the second camera module 120 includes a second lens 121, a second actuator 122 and the second image sensor 123. The second lens 121 can includes one or more than one optical lenses, which are used to obtain optical images of a framed scene. The structure and the optical coefficient of the first lens 111 can be the same as the structure and the optical coefficient of the second lens 121. The second image sensor 123 is configured to sense the optical images obtained by the second lens 121. The first camera module 110 and the second camera module 120 are configured to concurrently shoot and frame the same scene, and the second camera module 120 outputs the optical images sensed by the second image sensor 123 with a lower resolution. It can be set that the resolution of the image outputted by the second image sensor 123 is less than the resolution of the image outputted by the first image sensor 113, or the resolution of the image outputted by the second image sensor 123 is equal to the resolution of the image outputted by the first image sensor 113; namely, in this embodiment, the resolution of the image outputted by the first camera module 110 is greater than or is equal to the resolution of the image outputted by the second camera module 120. The second actuator 122 is configured to drive the second lens 121 to move relative to the second image sensor 123 under the control of the processing module 130, so as to make the second camera module 120 to automatically focus. The second actuator 122 is also configured to sense the position of the second lens 121, and send the position to the processing module 130 while the second lens 121 is focused on the focus. In this embodiment, the second actuator 122 can be a closed-loop motor, and the closed-loop motor can not only drive the second lens 121 to move so as to realize autofocus under the control of the processing module 130, but also sense position information corresponding to movements of the second lens 121 and send the position information to the processing module 130. In this embodiment, the resolution of the second image sensor 123 can be the same as the resolution of the first image sensor 113; the second image sensor 123 can also be an image sensor whose physical resolution is less than the physical resolution of the first image sensor 113.

In a camera module, an actuator can drive a lens to move to realize autofocus, during the process of movements of the lens driven by the actuator, the focusing position of the camera module located is located between the infinity (i.e., one of the position at infinity) and a closest focusing distance. In this embodiment, the closest focusing distance is a shortest focusing distance while the lens is focused on a focus; a focus search range is defined between the infinity to the closest focusing distance. In order to facilitate the actual operation, the focus search range can be set between a hyperfocal distance to the closest. Depending on the difference of depth of field, different camera modules have different hyperfocal distance. For example, the hyperfocal distance of a camera of 1/7 inch and 2 MP with an aperture value of 2.2 can be defined as 80 cm, and its closest focusing distance is 10 cm. With regard to the camera module, a focus position at 80 cm can be defined as a first focus point, and the closest position where the camera module can be focused can be defined as a second focus point. Thus, the distance between the first focus point and the second focus point is the whole focus search range including all the focus position, namely, the distance between the first focus point and the second focus point is the whole focus search range in which all the focus position can be searched. In this embodiment, the focus position at half of the hyperfocal distance can be defined as a focus end point. In this embodiment, the focus search range of the first camera module 110 is from the first focus point to the focus end point, and the focus search range of the second camera module 120 is from the second focus point to the focus end point. That is, the sum of the focus search range of the first camera module 110 and the focus search range of the second camera module 120 is equal to the distance between the hyperfocal distance and the closest focus distance, and the focus search range of the first camera module 110 and the focus search range of the second camera module 120 do not overlap each other. Understandably, the focus search range of the first camera module 110 can be set from the second focus point to the focus end point, and the focus search range of the second camera module 120 can be set from the first focus point to the focus end point.

Understandably, the focus end point can be determined by means of, but not limited to, the above mentioned method, and can also be a point between the first focus point and the second focus point, which can divide the whole focus search range into two segments that do not overlap each other. That is, the whole focus search range can be divided into a first focus area and a second focus area that do not overlap each other, so that the first camera module 110 and the second camera module 120 can search a focus position in a corresponding focus area respectively; for example, the first camera module 110 can search for a focus position in the first focus area, and the second camera module 120 can search for a focus position in the second focus area. The first focus area can be the focus area between the first focus point and the focus end point, and the second focus area can be the focus area between the second focus point and the focus end point. It should be understood that the first focus area can be the focus area between the second focus point and the focus end point, and the second focus area can be the focus area between the first focus point and the focus end point.

Understandably, the first focus point and the second focus point can be determined by means of other methods. For example, the position at infinity and the lens can be directly defined as two focus points respectively, as long as the position at hyperfocal distance and the position at the closest distance is located between two focus points.

The physical resolution of the first image sensor 113 and the second image sensor 123 can be the same, or be different from each other. Wherein, the physical resolution is the maximum resolution that an image sensor can output. When the physical resolution of the first image sensor 113 and the second image sensor 123 is the same, and the first lens 111 is the same as the second lens 121, namely, the first camera module 110 is the same as the second camera module 120, then the position of the focus of the second camera module 120 is the same as the position of the focus of the first camera module 110, that is, the focus position of the first camera module 110 is the same as that of the second camera module 120. When located at the focus, the distance between the first lens 111 and the first image sensor 113 is equal to the distance between the second lens 121 and the second image sensor 123. When the physical resolution of the first image sensor 113 is different from the physical resolution of the second image sensor 123, when located at the focus, the distance between the first lens 111 and the first image sensor 113 is equal to the distance between the second lens 121 and the second image sensor 123. Understandably, at the time of making the first camera module 110 and the second camera module 120, each focus of the second camera module 120 can be determined by means of a detection, thus, each focus of the first camera module 110 corresponding to the focus of the second camera module 120 can be further determined. For example, as for the same scene, when the second lens 121 of the second camera module 120 is located at a focus position A, a position B of the first lens 111 of the first camera module 110 can be obtained corresponding to the focus position A by means of the detection, therefore forming a corresponding relationship between the focus position A and the position B.

The processing module 130 is configured to control the first camera module 110 and the second camera module 120 to frame concurrently the scene, control the first camera module 110 to search for the focus position in the first focus area, and control the second camera module 120 to search for the focus position in the second focus area. When the first camera module 110 or the second camera module 120 searches for the focus position, then the processing module 130 controls the first camera module 110 to capture an image at the focus point on the basis of the focus position, and to output the image.

In this embodiment, the processing module 130 includes a framing control unit 131, a first focusing unit 132, a second focusing unit 133, a focusing determination unit 134 and an image capturing unit 135.

The framing control unit 131 is configured to control the first camera module 110 and the second camera module 120 to frame concurrently the same scene.

The first focusing unit 132 is configured to control the first camera module 110 to search for the focus position from the first focus point to the focus end point. The first focusing unit 132 can also automatically focus on the focus on the basis of a contrast ratio detection method. In detail, the first focusing unit 132 controls the first actuator 112 to move, making the focus position to move from the first focus point to the focus end point to search for the focus. The first focusing unit 132 can analyze the contrast ratios of different frames of the images sensed by the first image sensor 113. When the clearest image is obtained, the contrast ratio of the image is maximal, at this point, the focus position corresponding to the clearest image is the focus. The first actuator 112 can also sense position information of the focus. The second focusing unit 133 is configured to control the second camera module 120 to search for the focus position from the second focus point to the focus end point. The second focusing unit 133 can automatically focus on the focus on the basis of a contrast ratio detection method. In detail, the second focusing unit 133 controls the second actuator 122 to move, making the focus position to move from the second focus point to the focus end point so as to search for the focus. The second focusing unit 133 can analyze the contrast ratios of different frames of the images sensed by the second image sensor 123. When the clearest image is obtained, the contrast ratio of the image is maximal, at this point, the focus position corresponding to the clearest image is the focus. The second actuator 122 can sense position information of the focus.

The focus determination unit 134 is configured to receive the position information of the focus sent by the first focusing unit 132 or the second focusing unit 133, and control the first camera module 110 to capture an image at the focus according to the focus information o the focus. In detail, when the focus determination unit 134 receives the focus information from the first focusing unit 132, the focus determination unit 134 controls the first camera module 110 to keep at the focus. When the focus determination unit 134 receives the focus information from the second focusing unit 133, the focus determination unit 134 can control the first camera module 100 to directly move to the focus according to the focus information of the second focus unit 133. In detail, the focus determination unit 134 controls the first actuator 112 to drive the first lens 111 to move to the focus, so as to make the first camera module 110 to obtain clear images directly. Because the focus of the first camera module 110 and the focus of the second camera module 120 have the corresponding relationship, that is, the focus of the first camera module 110 corresponds to the focus of the second camera module 120, so that the second focusing unit 133 can determine the position of the focus of the first camera module 110 according to the position information of the focus of the second camera module 120, so as to directly control the first actuator 112 to drive the first lens 111 to move to the focus, therefore achieving autofocus.

When the physical resolution of the first image sensor 113 is the same as the physical resolution of the second image sensor 123, and the first lens 111 is the same as the second lens 121, the position of the focus of the second camera module 120 is the same as the position of the focus of the first camera module 110, namely, the focus position of the second camera module 120 is the same as the focus position of the first camera module 110. When located at the focus, the distance between the first lens 111 and the first image sensor 113 is equal to the distance between the second lens 121 and the second image sensor 123. When the physical resolution of the first image sensor 113 is different from the physical resolution of the second image sensor 123, the focus of the first camera module 110 can be determined on the basis of the corresponding relationship between each focus of the second camera module 120 and each focus of the first camera module 110.

The image capturing unit 135 is configured to obtain and capture the image outputted by the first image sensor 113 while the first camera module 110 is focused on the focus. In this embodiment, since the first image sensor 113 outputs the image with a higher resolution, so that the image obtained by the image capturing unit 135 has a high resolution.

Understandably, since when the first focusing unit 132 controls the first camera module 110 to focus, at the same time, the second focusing unit 133 also controls the second camera module 120 to focus, and when the focus is located near to the focus end point, the focus position at which the clear images can be obtained is not the only, the first camera module 110 and the second camera module 120 may find the focus concurrently. Thus, when the first camera module 110 and the second camera module 120 find the focus at the same time, the focus determination unit 134 is also configured to determine to employ the focus of the first camera module 110, namely, the focus determination employs the focus that is subject to the focus of the first camera module 110. That is, the focus fond by a camera module which obtains the image is employed, so that the focus determination unit 130 does not need to control the first camera module 110, on the basis of the focus obtained by the second camera module 120, to focus, therefore reducing focusing time and avoiding image dithering.

Understandably, in the case that requirement for resolution of some images is not high, when the second camera module 120 first searches for the focus, the processing module 130 can also control the second camera module 120 to shoot and capture an image at the focus.

The display module 140 is configured to display the image obtained by the image capturing unit 135.

Furthermore, the image capturing terminal 100 can further includes a storage element, which is configured to store the images obtained by the image capturing unit 135.

It should be understood that there is a certain distance between the first camera module 110 and the second camera module 120 that could lead to a position deviation between the image obtained by the first camera module 110 and the image obtained by the second camera module 120. The processing module 130 can further include a compensation unit (such as, a compensation circuit), and the compensation unit is configured to adjust the image outputted by the second camera module 120 according to the distance between the first camera module 110 and the second camera module 120, so as to make the second camera module 120 to output the images consistent with the images outputted by the first camera module 110.

The image capturing terminal 100 provided in the present disclosure includes: a first camera module 110 and a second camera module 120, and the first camera module 110 can output the images with higher resolution. When contrast ratio detection based on frame difference is used to achieve autofocus, the focus search range is divided into two parts (such as a first focus area and a second focus area) that do not overlap each other, the first camera module 110 and the second camera module 120 are concurrently controlled to search for the focus in the two parts at the same time, when the focus is found, then the first camera module 110 is controlled to capture clear images at the focus on the basis of the focus information of the focus, compared with only the first camera module 110 outputting the image with high resolution for autofocus, which can improve the speed of focus. Thus, the image capturing terminal 100 in this embodiment can guarantee the output of high resolution images, and have a shorter autofocus time at the same time, thereby improving the speed of autofocus and enhancing the user experience.

Figure 2:
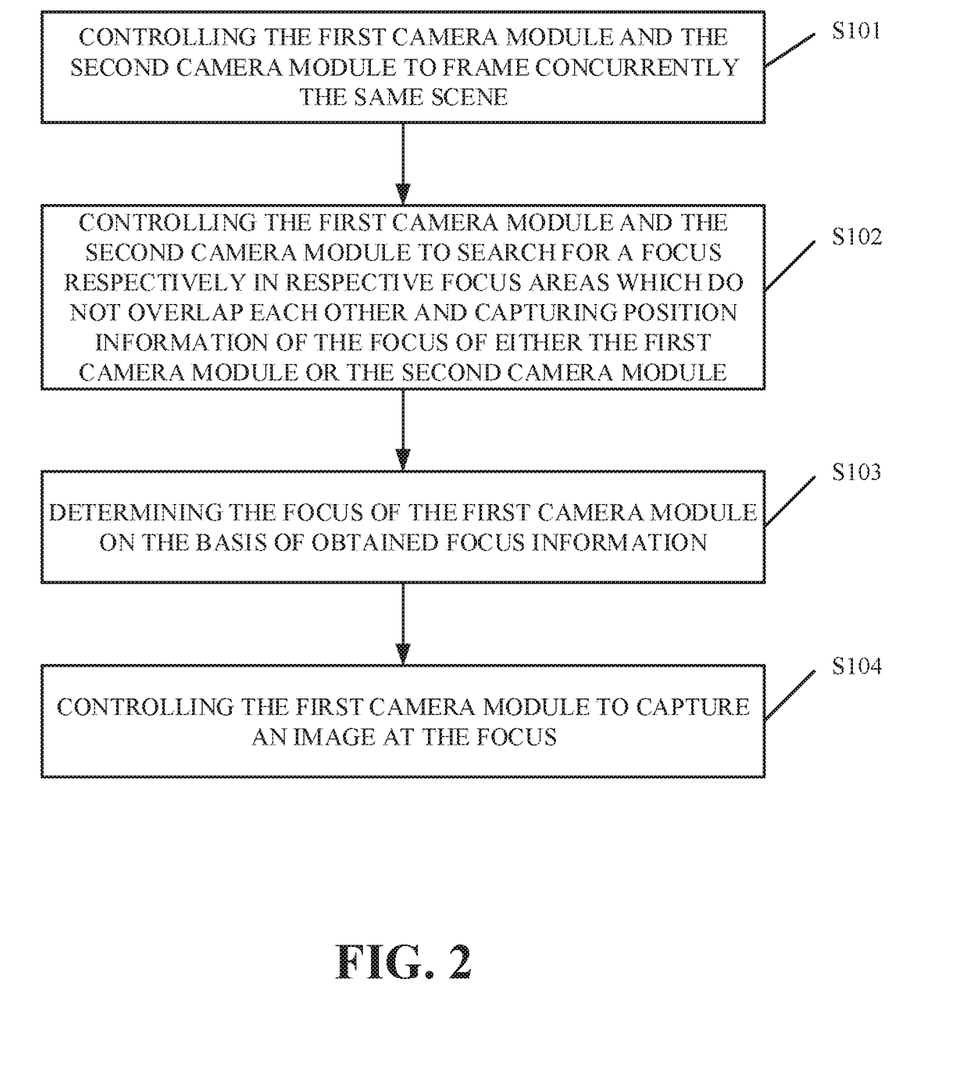
FIG. 2 is a flowchart of an image capturing method according to an embodiment of the present disclosure.

Referring to FIG. 2, FIG. 2 is a flowchart of an image capturing method according to an embodiment of the present disclosure, and the image capturing method can be realized and implemented by the image capturing terminal 100 as shown in FIG. 1. The image capturing terminal 100 includes a first camera module 110, a second camera module 120 and a processing module 130. The image capturing method at least includes the following steps.

Step S101, controlling the first camera module 110 and the second camera module 120 to frame concurrently the same scene.

In detail, the processing module 130 of the image capturing terminal 100 is used to control the first camera module 110 and the second camera module 120 to frame concurrently the same scene. In this embodiment, the optical axis of the first camera module 110 is parallel to the optical axis of the second camera module 120, and a first image sensor 113 and a second image sensor 123 are located in the same plane perpendicular to the first camera module 110. A first lens 111 of the first camera module 110 and a second lens 121 of the second camera module 120 have the same optical coefficient.

Step S102, controlling the first camera module 110 and the second camera module 120 to search for a focus respectively in respective focus areas which do not overlap each other and capturing position information of the focus of either the first camera module 110 or the second camera module 120.

In this embodiment, the processing module 130 controls the first camera module 110 and the second camera module 120 to search for a focus respectively in respective focus areas that do not overlap each other. In detail, the processing module 130 controls the first camera module 110 to search for a focus in a first focus area, and at the same time controls the second camera module 120 to search for a focus in a second focus area; the first focus area and the second focus area do not overlap each other. The first focusing unit 132 can automatically focus on the focus on the basis of a contrast ratio detection method. In this embodiment, in detail, the first focusing unit 132 can control the first actuator 112 to drive the first lens 111 to move, making the focus position to move from the first focus point to the focus end point to search for a focus. The first focusing unit 132 can analyze the contrast ratios of different frames of the images sensed by the first image sensor 113, when the clearest image is obtained, the contrast ratio of the image is maximal, at this point, the position where the first lens 111 is located corresponding to the clearest image is the focus. The first actuator 112 can also sense position information at the focus, and send the position information to the processing unit 130. The second focusing unit 133 can automatically focus on the focus on the basis of the contrast ratio detection method. In this embodiment, in detail, the second focusing unit 133 can control the second actuator 122 to drive the second lens 121 to move, making the focus position to move from the second focus point to the focus end point to search for a focus. The second focusing unit 133 can analyze the contrast ratios of different frames of the images sensed by the second image sensor 123, when the clearest image is obtained, the contrast ratio of the image is maximal, at this point, the position where the second lens 121 is located corresponding to the clearest image is the focus. The second actuator 122 can also sense position information at the focus, and send the position information to the processing unit 130.

Under normal conditions, only one of the first camera module 110 and the second camera module 120 can search to the focus position, therefore, only one position information of the focus can be obtained. When the first focusing unit 132 controls the first camera module 110 to focus, and at the same time, the second focusing unit 133 controls the second camera 120 to focus. When the focus is located near to the focus end point, because the focus position where the clear images can be obtained is not the only one, namely, the clear images can be obtained at more than one focus position, for example, the first camera module 110 and the second camera module 120 may find the focus at the same time. Thus, when the first camera module 110 and the second camera module 120 find concurrently the focus, then the focus information of the first camera module 110 is employed, namely, when the focuses of the first camera module 110 and the second camera module 120 is found at the same time, the focus of the first camera module 110 is employed.

Step S103, determining the focus of the first camera module 110 on the basis of obtained focus information.

In this embodiment, in detail, when the focus information is obtained by the first camera module 110, the first camera module 110 can stop searching for the focus to capture an image. The second camera module 120 can also stops searching for the focus.

On the basis of the position information of the focus sent by the second actuator 122 and according to the focus information of the second module 120 and the corresponding relationship between the focus of the first camera module 110 and the second camera module 120, the second focusing unit 133 of the processing module 130 can control the first actuator 112 to drive the first lens 111 to move to the focus position when the focus information is obtained by the second camera module 120, so as to make the first camera module 110 to obtain clear images directly.

Step S104, controlling the first camera module 110 to capture an image at the focus.

In this embodiment, in detail, the first the camera module 110 can output images using high resolution, that is, the first camera module 110 can employ high resolution for outputting the images, which thereby can guarantee that the resolution of outputted images meets the requirements.

Understandably, when a user replaces current scene with other scenes, then high resolution images of different scenes can be obtained by just repeating the step S102 to the step S104.

In summary, the image capturing method provided in the present disclosure employs a first camera module 110 and a second camera module 120, and the first camera module 110 and the second module 120 are used for framing concurrently the same scene, and the first camera module 110 can output the images with higher resolution. The focus search range is divided into two parts (such as a first focus area and a second focus area) that do not overlap each other, the first camera module 110 and the second camera module 120 are concurrently controlled to search for a focus in their respective parts at the same time, when focus information of the focus is found, the first camera module 110 is controlled to capture clear images at the focus on the basis of the focus information of the focus, compared with only the first camera module 110 outputting the image with high resolution for autofocus, which can improve the speed of focus. Thus, the image capturing method in this embodiment can guarantee the output of high resolution images, and have a shorter autofocus time at the same time, thereby improving the speed of autofocus and enhancing the user experience.

A person having ordinary skills in the art can realize that part or whole of the processes in the methods according to the above embodiments may be implemented by a computer program instructing relevant hardware. The program may be stored in a computer readable storage medium, and execute by at least one processor of the laptop computer, the tablet computer, the smart phone and PDA (personal digital assistant) and other terminal devices. When executed, the program may execute processes in the above-mentioned embodiments of methods. The storage medium may be a magnetic disk, an optical disk, a Read-Only Memory (ROM), a Random Access Memory (RAM), et al. While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. A terminal for image capturing, comprising:
a first camera module;
a second camera module, wherein the first camera module and the second camera module are configured to frame concurrently the same scene and detect and analyze contrast ratios of different frames of images within a focus search range, wherein the focus search range is determined by a first focus point and a second focus point, and the focus search range comprises a first focus area and a second focus area that do not overlap each other;

a processor; and
a memory that stores executable instructions, which when executed by the processor, become operational with the processor to:
control the first camera module to search for a first focus in the first focus area, and to simultaneously control the second camera module to search for a second focus in the second focus area;
capture focus information of one of the first camera module or the second camera module; and
control the first camera module to capture an image at the first focus of the first camera module,
wherein when the focus information of the first camera module is captured, control the first camera module to be located at the first focus, capture the image at the first focus, and output the image; and
wherein when the focus information of the second camera module is captured, control a focus position of the first camera module to directly move to the first focus according to the focus information of the second camera module, capture the image at the first focus, and output the image.

2. The terminal of claim 1, wherein the first focus point comprises a focus position at a hyperfocal distance, the second focus point comprises a focus position where a camera module can be focused at the closest distance, a focus end point comprises a focus position at half of the hyperfocal distance, the first focus area comprises a focus range between the first focus point and the focus end point, and the second focus area comprises a focus range between the second focus point and the focus end point.

3. The terminal of claim 1, wherein the first focus point comprises a focus position at a hyperfocal distance, the second focus point comprises a focus position where a camera module can be focused at the closest distance, a focus end point comprises a focus position at half of the hyperfocal distance, the first focus area comprises a focus range between the second focus point and the focus end point, and the second focus area comprises a focus range between the first focus point and the focus end point.

4. The terminal of claim 1, wherein the first camera module comprises a first lens, a first actuator, and a first image sensor, and the second camera module comprises a second lens, a second actuator, and a second image sensor;
wherein the first actuator is configured to drive the first lens to move relative to the first image sensor to search for the first focus, and the second actuator is configured to drive the second lens to move relative to the second image sensor to search for the second focus; and
wherein the executable instructions become further operational with the processor to control the first actuator to directly drive the first lens to move to the focus position of the first camera module according to position information corresponding to the second focus of the second camera module.

5. The terminal of claim 1, wherein the executable instructions become further operational with the processor to:
when the first focus is searched by the first camera module and the second focus is searched by the second camera module at the same time, determine the first focus searched by the first camera module as a corresponding focus of the first camera module corresponding to the second focus of the second camera module.

6. The terminal of claim 1, wherein the executable instructions become further operational with the processor to:
when the focus information of the first camera module is received, control the first camera module to be located at the first focus, capture the image at the first focus, and output the image.

7. The terminal of claim 1, wherein the executable instructions become further operational with the processor to:
when the focus information of the second camera module is received, control the first camera module to directly move a focus position of the first camera module to the first focus based on the focus information of the second camera module.

8. The terminal of claim 1, wherein the first camera module is configured to provide images whose resolution is greater than that of images provided by the second camera module.

9. A method for image capturing for an image capturing terminal comprising a first camera module and a second camera module, comprising:
controlling the first camera module and the second camera module to frame concurrently the same scene;
controlling the first camera module to search for a first focus in a first focus area and capturing first position information of the first focus of the first camera module, and controlling the second camera module to search for a second focus in a second focus area that does not overlap the first focus area and capturing second position information of the second focus of the second camera module;
determining a first focus of the first camera module based on obtained focus information; and
controlling the first camera module to capture an image at the first focus of the first camera module,
wherein when focus information of the first camera module is captured, controlling the first camera module to be located at the first focus, capturing the image at the first focus, and outputting the image; and
wherein when focus information of the second camera module is captured, controlling a focus position of the first camera module to directly move to the first focus according to the focus information of the second camera module.

10. The method of claim 9, wherein an optical axis of the first camera module is parallel to an optical axis of the second camera module.

11. The method of claim 9, wherein when the first focus of the first camera module and the second focus of the second camera module are found at the same time, the focus information of the first camera module is employed.

12. The method of claim 9, wherein a first focus point comprises a focus position at a hyperfocal distance, a second focus point comprises a focus position where a camera module can be focused at the closest distance, a focus end point comprises a focus position at half of the hyperfocal distance, the first focus area comprises a focus range between the first focus point and the focus end point, and the second focus area comprises a focus range between the second focus point and the focus end point.

13. The method of claim 9, wherein a first focus point comprises a focus position at a hyperfocal distance, a second focus point comprises a focus position where a camera module can be focused at the closest distance, a focus end point comprises a focus position at half of the hyperfocal distance, the first focus area comprises a focus range between the second focus point and the focus end point, and the second focus area comprises a focus range between the first focus point and the focus end point.

14. A terminal for image capturing, comprising:
a first camera module;
a second camera module, wherein the first camera module and the second camera module are configured to frame concurrently the same scene, and detect and analyze contrast ratios of different frames of images within a focus search range, wherein the focus search range comprises a first focus area and a second focus area;
a processor; and
a memory that stores executable instructions, which when executed by the processor, become operational with the processor to:
control the first camera module to search for a first focus in the first focus area and to simultaneously control the second camera module to search for a second focus in the second focus area;
control one of the first camera module or the second camera module to capture focus information thereof for capturing an image at a corresponding focus; and
control the first camera module to capture an image at the first focus of the first camera module,
wherein when the focus information of the first camera module is received, control the first camera module to be located at the first focus based on the focus information of the first camera module; and
wherein when the focus information of the second camera module is received, control the first camera module to directly move a focus position of the first camera module to the first focus based on the focus information of the second camera module.

15. The terminal of claim 14, wherein a first focus point comprises a focus position at a hyperfocal distance, a second focus point comprises a focus position where a camera module can be focused at the closest distance, a focus end point comprises a focus position between the first focus point and the second focus point, the first focus area comprises a focus range between the first focus point and the focus end point, and the second focus area comprises a focus range between the second focus point and the focus end point.

16. The terminal of claim 14, wherein a first focus point comprises a focus position at a hyperfocal distance, a second focus point comprises a focus position where a camera module can be focused at the closest distance, a focus end point comprises a focus position between the first focus point and the second focus point, the first focus area comprises a focus range between the second focus point and the focus end point, and the second focus area comprises a focus range between the first focus point and the focus end point.

17. The terminal of claim 14, wherein the executable instructions become further operational with the processor to:
when the focus information of the first camera module is received, control the first camera module to be located at the first focus, capture the image at the first focus, and output the image.

18. The terminal of claim 14, wherein the executable instructions become further operational to:
when the focus information of the second camera module is received, control the first camera module to directly move a focus position of the first camera module to the first focus based on the focus information of the second camera module.

19. The terminal of claim 18, wherein the first camera module comprises a first lens, a first actuator, and a first image sensor, and the second camera module comprises a second lens, a second actuator, and a second image sensor;

wherein the first actuator is configured to drive the first lens to move relative to the first image sensor to search for the first focus, and the second actuator is configured to drive the second lens to move relative to the second image sensor to search for the second focus; and     wherein the executable instructions become further operational with the processor to control the first actuator to directly drive the first lens to move to the focus position of the first camera module according to position information corresponding to the second focus of the second camera module.

20. The terminal of claim 14, wherein the executable instructions become further operational with the processor to:

when the first focus is searched by the first camera module and the second focus is searched by the second camera module at the same time, determine the first focus searched by the first camera module as a corresponding focus of the first camera module corresponding to the second focus of the second camera.

\* \* \* \* \*